United States Patent [19]

Campagne

[11] 4,313,960
[45] Feb. 2, 1982

[54] PREPARATION OF CONCENTRATED NATURAL VINEGAR

[75] Inventor: Constant J. V. L. Campagne, Bilthoven, Netherlands

[73] Assignee: Luycks Producten B.V., Ad Diemen, Netherlands

[21] Appl. No.: 110,746

[22] Filed: Jan. 9, 1980

[30] Foreign Application Priority Data

Jan. 10, 1979 [NL] Netherlands .......................... 7900196

[51] Int. Cl.³ .......................... C12J 1/00; C12P 7/54; C12P 7/62
[52] U.S. Cl. ..................................... 426/17; 426/271; 426/384; 435/135; 435/140
[58] Field of Search ................ 426/17, 384, 135, 271; 435/140

[56] References Cited

U.S. PATENT DOCUMENTS 3,404,006 10/1968 Malick ............................ 426/384 X
4,076,844 2/1978 Ebner et al. .......................... 426/17

OTHER PUBLICATIONS

Amerine, et al., The Technology of Wine Making, 3rd ed., The Ari. Publ. Co., Inc., Westport, Conn., 1972 (pp. 613, 614 & 662–664), p. 548, A48.

Primary Examiner—David M. Naff

[57] ABSTRACT

A concentrated natural vinegar with an excellent natural flavor is prepared by treating a product obtained by freeze concentration of natural vinegar with a greater amount of alcohol obtained by natural fermentation than is already present in the natural vinegar due to its preparation. When contacting the mixture of freeze concentrated natural vinegar and alcohol with an acidic ion exchanger, acetic acid esters are prepared which correspond to acetic acid esters extracted from natural products.

2 Claims, No Drawings

PREPARATION OF CONCENTRATED NATURAL VINEGAR

The invention relates to a process for the preparation of concentrated natural vinegar having an excellent flavor and to a process for the preparation of acetic acid esters.

The preparation of natural vinegar takes place in general by oxidative fermentation of alcohol (Ullmanns Encyklopädie der technischen Chemie, 4th edition (1976), volume 11, pages 41–55). The natural vinegar which has been prepared in this way, needs a certain ripening period to develop a good flavor. This period amounts to about three months for natural vinegar containing 10–13% by weight of acetic acid. During this ripening period among others a part of alcohol, which may be possibly present, is converted into ethyl acetate. This conversion proceeds very slowly and occurs only in a very limited degree. The concentration of ethyl acetate can obtain a value of at most 0.06 percent by weight. The ethyl acetate contributes highly to the special flavor of ripened natural vinegar in view of its volatility and its agreeable fragrance. However, for the preparation of natural vinegar having a good flavor in this way much storage accomodation is necessary.

It has also been proposed to concentrate natural vinegar in order to decrease the transport costs of the natural vinegar between the place of manufacturing and the place where the vinegar is bottled, canned or packed in another way. U.S. Pat. No. 4,076,844 refers to a process in which vinegar of lower acidity is subjected to freezing. The ice so formed contains very little acid and is removed by centrifugation, leaving the desired higher acidity vinegar, having an acetic acid concentration of 20 percent weight by volume or more. However, this process is expensive because it requires a large investment in machinery and entails high operating costs in the form of electrical energy and man power. In view thereof according to U.S. Pat. No. 4,076,844 a two-stage fermentation process has been developed, according to which vinegar with an acetic acid concentration between 16 and 17 percent weight by volume was obtained. In this process a mixture containing alcohol, acetic acid and Acetobacter is subjected to fermentation. When in this mixture the total concentration, that is the concentration of alcohol plus the concentration of acetic acid, is between 12 and 15% and the alcohol concentration is 1–5% and the acetic acid concentration is 7–10%, a 30–100 percent solution of alcohol in water is added. During the further fermentation the acetic acid concentration increases to 13–15%, whereas the alcohol concentration is kept substantially constant by the controlled addition of alcohol. If the acetic acid concentration has reached a value of 13–15%, the addition of alcohol is stopped and 20–50% of the fermentation liquid is introduced into a second fermentation stage without interrupting the fermentation in the first stage. The acetic acid concentration of the first fermentation stage is brought back to the starting level thereof after the withdrawal of a portion of the liquid from this stage, for example by the addition of liquid containing little acetic acid (e.g. 0–2% or 1–6% respectively), a greater amount of alcohol (e.g. more than 11% or 2.5–10% respectively) and moreover nutrient for the bacteria, whereafter the fermentation is continued. In the second fermentation stage the total concentration of alcohol and acetic acid is kept substantially constant during the continued fermentation, but the acetic acid concentration increases to above 15% and the alcohol concentration decreases to substantially zero, whereby a vinegar having an acetic acid concentration of 16–17% and an alcohol content of e.g. at most 0.2% is obtained. (In the above description the concentration of alcohol is expressed in volume by volume and the concentration of acetic acid in weight by volume.)

However, this known process is cumbersome, whereas the highest possible acetic acid concentration in the vinegar is not higher than 17%.

From British Pat. No. 493,224 a method of producing fruit vinegar is known, according to which alcoholic liquids obtained either by enrichment of the natural sugar content in fruit juices, extracts or mashes, and subsequent alcoholic fermentation, or by the fermentation of fruit juices, extracts or mashes and subsequent elimination of water are subjected to acetous fermentation, the alcohol content of these liquids being thus increased to such an extent over and above the alcohol content corresponding to the natural sugar content of the raw juices, that high percentage vinegars containing more than 5% by weight of acetic acid are obtained, even when working up fruit poor in sugar. However, with the use of this method a fruit vinegar is obtained having an acetic acid concentration hardly more than 10% by weight.

According to the published Netherlands patent application 7609825 vinegar is concentrated by contacting vinegar with a hydrate forming substance, such as trichlorofluoromethane or dichloromethane, at a temperature below the maximum temperature, at which the hydrate is formed. Thereafter the hydrate formed, together with any present hydrate former, is separated from the concentrated vinegar and any formed solid vinegar, for example by sublimation or dissolution of solid hydrate under such conditions, that solid acetic acid is not sublimed or dissolved and is not denaturated. In this way vinegar having a concentration up to 80% by weight of acetic acid can be obtained. However, this process has the disadvantage that the hydrate forming substances can only be removed with high costs from the concentrated natural vinegar, whereas the flavor of the concentrated natural vinegar is lost completely or substantially completely.

Of course, it is possible to add synthetic ethyl acetate as a flavoring agent to vinegar. In that case the vinegar cannot be considered anymore as a natural product. Moreover, in a number of countries the use of synthetic alcohol in foodstuffs is prohibited and always some synthetic alcohol will be formed by hydrolysis when using synthetic ethyl acetate. By an analysis of the product concerning the $C^{14}$-isotope of carbon it is always possible to detect the use of synthetic products, because these synthetic products have a different $C^{14}$-content than natural products. However, natural acetic acid esters are very costly, because they must be extracted from natural products, such as fruits.

It is an object of the invention to prepare concentrated natural vinegar with a natural flavor without the disadvantages of the known processes.

It has now been found that concentrated natural vinegar having an excellent flavor can be prepared according to the invention by treating a product obtained by freeze concentration of natural vinegar with a greater amount of alcohol obtained by natural fermentation than already present due to the preparation of the natural vinegar. If ethanol is used as the alcohol obtained by natural fermentation, ethyl acetate is formed, so that after dilution of the resulting concentrated acetic acid product, a natural vinegar is obtained having the flavor of vinegar which has ripened for a long period. By the use of this process, which can be carried out very easily and with a great production rate, the ripening of vinegar has become superfluous and a very concentrated natural acid having an excellent flavor may be obtained, from which by a simple dilution with water the commercial product natural vinegar can be prepared.

These advantages of the process of the invention are much more important than the disadvantage of the use of the relatively expensive freeze concentration machinery.

Preferably the amount of alcohol necessary for the process of the invention is added to the vinegar, before it is subjected to freeze concentration, although the alcohol may also be added to the natural vinegar after the freeze concentration.

Preferably, the weight ratio of the sum of the amounts of alcohol and ethyl acetate to the amount of acetic acid is at least 1:20. Preferably, the concentrated natural vinegar is treated with the alcohol for a period sufficient to obtain a weight ratio of the amount of ethyl acetate to the amount of acetic acid of at least 1:150. Correspondingly the treatment time is in general at least 24 hours, but preferably 2-5 days.

It has also been found that by the use of the freeze concentration of natural vinegar and the addition of an alcohol obtained by natural fermentation acetic acid esters can be prepared, which completely correspond to the acetic acid esters extracted from natural products. For that purpose a mixture of natural vinegar and alcohol is subjected to freeze concentration or an alcohol is added to a concentrated vinegar obtained by freeze concentration of natural vinegar. Thereafter the resulting mixture is contacted with an acidic ion exchange resin. By the catalytic action of such a resin the formation of acetic acid esters, such as ethyl acetate, is highly promoted. By the formation of the ester the freezing point of the solution increases, because water is formed and the total concentration of the number of dissolved molecules decreases.

Subsequently, the resulting acetate containing product may again be subjected completely or partially to freeze concentration, if desired in the presence of a new portion of vinegar, and contacted with the acidic ion exchange resin in the presence of an alcohol, whereby the acetate content is again increased. The product obtained after the contact of the mixture with the ion exchange resin may be recycled again completely or partially to the freeze concentration apparatus. However, the mixture obtained after the contact with the acidic ion exchange resin may also be subjected to known separation methods to recover therefrom the acetic acid ester, such as the ethyl acetate, it being, of course, also possible to recover the acetate from a portion of this mixture and to recycle the remaining portion of the mixture to the freeze concentration apparatus.

As an acidic ion exchange resin in general a strongly acidic resin is used, for example a sulfonated polymer of divinylbenzene and styrene.

It should be noted in this connection that the published Netherlands patent application 7608113 describes a method for purifying liquids, such as wine vinegar, malt vinegar and light beer, by contacting said liquid with a strongly acidic cation exchanger, thus removing the turbidity precursors from the liquid. However, this literature does not refer to the treatment of a mixture of concentrated natural vinegar and alcohol with such a cation exchange resin to obtain acetic acid esters.

According to the invention, therefore, the same freeze concentration apparatus can be used either for the preparation of concentrated natural vinegar or for the preparation of acetic acid esters, such as ethyl acetate, which corresponds to ethyl acetate extracted directly from natural products, but can be obtained with much lower costs.

The process of the invention has been explained in the above predominantly with reference to the use of ethanol as an alcohol. However, in principle all alcohols can be used, which may be obtained by natural fermentation, such as the aliphatic alcohols having 1-5 carbon atoms, e.g. methanol, propanol, butanol and amyl alcohol. Mixtures of these alcohols can also be used.

The following examples illustrate the invention without restricting its scope.

EXAMPLE I

To a vinegar obtained by natural fermentation and having an acetic acid concentration of 12% by weight and an ethanol concentration of 0.3% by weight an amount of 0.6% by weight, based upon the acetic acid, of ethanol obtained by natural fermentation was added. In a conventional freeze concentration apparatus the mixture was concentrated to an acetic acid concentration of 42% by weight. After storage for three days the ethyl acetate content was 0.4% by weight and the concentrated product had the flavor of a vinegar, which had ripened for a long time.

EXAMPLE II

A vinegar obtained by natural fermentation and having an acetic acid concentration of 12% by weight and an ethanol concentration of 0.3% by weight was concentrated in a conventional freeze concentration apparatus to an acetic acid content of 45% by weight and an alcohol content of 1.1% by weight. To 5 parts by weight of the vinegar concentrated in this way 2 parts by weight of alcohol having an ethanol content of 96% were added, whereafter the mixture was passed at a temperature of 80° C. through a column packed with Duolite C 20, a strongly acidic ion exchange resin prepared from a sulfonated polymer of divinylbenzene and styrene. The effluent from the column had an ethyl acetate content of 12% by weight, based on the total content of dissolved substances.

EXAMPLE III

An aqueous solution of 8% by weight of potato starch was subjected to natural anaerobic fermentation by seeding with micro-organisms of the species *Clostridium butylicum*. The solution obtained by this fermentation contained, in addition to acetone, 1.8% by weight of butanol and 0.22% by weight of ethanol.

To 5 parts by volume of this acetone/alcohol solution 1 part by volume of natural vinegar having an acetic acid content of 12% by weight and an ethanol content of 0.25% by weight was added. The volume of the resulting mixture was reduced to 7% of its original volume by means of freeze concentration.

During the freeze concentration the solution was contacted with the resin Duolite C 20 at increasing concentration. After the concentration the resin was separated from the solution and to the resulting solution, enough sodium chloride was added that phase separation occurred. The upper layer containing ethyl acetate and butyl acetate was decanted and the acetates were recovered from said layer.

I claim:

1. A process for the preparation of a concentrated flavored natural vinegar which comprises freeze concentrating natural vinegar to produce a vinegar having an acetic acid concentration of at least 20% (weight/volume), adding to the concentrated vinegar at least one alcohol including ethanol obtained by natural fermentation, storing the resulting mixture for 2–5 days so as to produce a concentrated natural vinegar containing ethyl acetate in such an amount that the weight ratio of ethyl acetate to acetic acid is at least 1:150, the amount of ethanol added being such that the weight of the sum of the amount of ethanol and ethyl acetate to the amount of acetic acid is at least 1:20.

2. A process for the preparation of a concentrated flavored natural vinegar, which comprises adding to natural vinegar at least one alcohol including ethanol obtained by natural fermentation, freeze concentrating the resulting mixture to produce a concentrated vinegar product containing at least 20% (weight/volume) of acetic acid, storing said concentrated mixture for 2–5 days so as to produce a concentrated natural vinegar containing ethyl acetate in such an amount that the weight ratio of ethyl acetate to acetic acid is at least 1:150, the amount of ethanol added being such that the weight ratio of the sum of the amount of ethanol and ethyl acetate to the amount of acetic acid is at least 1:20.

* * * * *